March 27, 1973    R. W. BUSHMEYER ET AL    3,723,129

BITE-SIZE BODY OF HAY

Filed May 27, 1970

United States Patent Office 3,723,129
Patented Mar. 27, 1973

3,723,129
BITE-SIZE BODY OF HAY
Richard W. Bushmeyer, Rockford, Ill., and Charles D. Miller, deceased, late of Rockford, Ill., by John Holmstrom, Jr., administrator, Rockford, Ill., assignors to J. I. Case Company
Continuation-in-part of application Ser. No. 770,900, Oct. 23, 1968, which is a continuation of application Ser. No. 638,665, May 15, 1967, which in turn is a continuation of application Ser. No. 236,742, Nov. 9, 1962, all now abandoned. This application May 27, 1970, Ser. No. 40,964
Int. Cl. A23k 1/00
U.S. Cl. 99—2                    1 Claim

ABSTRACT OF THE DISCLOSURE

A small or bite-size self-sustaining pellet of animal food in the form of a cylindrical continuous ribbon-like body of material which is spirally wound about the axis of the cylinder with the layers having a relatively higher density near the outer perimeter relative to the layers in the open center. The ribbon-like body of material is also helically wound about the axis of the cylinder.

REFERENCE TO RELATED APPLICATIONS

This application is a continuation-in-part of application Ser. No. 770,900 filed Oct. 23, 1968, now abandoned, which contains subject matter common to application Ser. No. 638,665 filed May 15, 1967, now abandoned, which was a continuation of application Ser. No. 236,742 filed Nov. 9, 1962, also now abandoned.

BACKGROUND OF THE INVENTION

The present application relates to a food product and especially to animal food, and particularly to pellets thereof.

In the past, bodies of this nature have not been entirely satisfactory, since many of them are small and hard, and not of a texture with which the cattle are familiar. Furthermore, they have commonly consisted of a myriad of short sections or stems which are often stiff, sharp and irritating to the mouths of the cattle. On the other hand, other attempts to produce pellets have resulted in pellets that are too soft and that crumble readily in storage or as a result of handling, and which crumbling results in a mass of short fragments. Such fragments are not readily manageable by ordinary means. They are apt to be unpalatable and rejected by the cattle. This, of course, results in substantial waste.

Furthermore, it is known that short stems or fragments, in the case of dairy cattle, fail to afford the type of roughage necessary to stimulate the production of milk having a high butterfat content. It is known that a superior quality of milk is produced when the cows have natural hay, or long fiber material for food.

SUMMARY OF THE INVENTION

With the above in view, an object of the invention is to provide an improved pellet which is of a favorable size to be handled mechanically and which will be made of long fibers, and otherwise of a character to be favorably received by the cattle in one piece or what may be termed bite-sized. A further object is to provide such a pellet which is satisfactorily stable but not too hard; a pellet which will be in the form of a roll of relatively long fibers, and which if it unrolls, results in material which is acceptable to cattle for the same reason as baled hay or loose hay.

A further object is to provide a pellet which, while hard in the region adjacent the outer surface, has the extreme outer layer of fibers less tightly compacted whereby the animals can readily start an unwrapping process in breaking up the pellets, by getting hold of the less tightly packed layer of fibers.

A further object is to provide a pellet in which the material provides its own binding agent.

Further objects and advantages will become apparent from the following specification and the annexed drawings in which.

Figure 2:
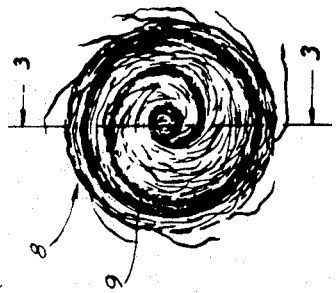
FIG. 2 is an end elevation of the same.
Figure 1:
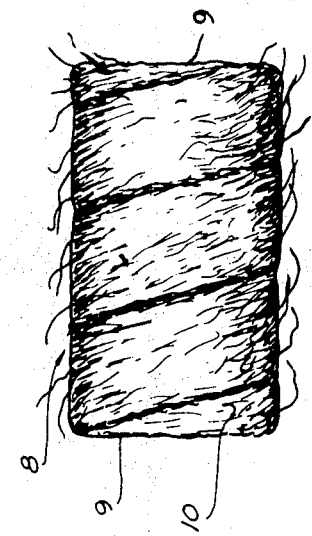
FIG. 1 is a side elevation of a pellet of forage material of the type contemplated.

The pellet 8 is substantially round in cross section, as seen in FIGS. 1 and 2, and has substantially flat ends 9, the pellet being formed of a mass of fibers 10 of forage material. The fibers are wound on each other to form a roll or body of the desired size, and the resulting roll is compacted sufficiently to be self-sustaining. In the preferred arrangement, the fibers are closer together or more densely compacted toward the outer surface of the roll than they are toward the center.

The fibers, rather than being wound in a random or haphazard arrangement, are first arranged in a ribbon-like body having substantial width and minimum thickness. The fibers are arranged parallel to each other in a very general sense, but are interlaced sufficiently that, when the ribbon is wound into the above-mentioned roll and compressed, they will tend to cling to each other and form a relatively coherent body. The ribbon is designated as 12 in FIG. 4, and is wound on itself, and the resulting body or roll is preferably compressed to form the pellets.

It is to be noted that, in leafy hay such as alfalfa, for example, most of the leaves will be trapped and entangled with the stems in the ribbon 12, so as to be interspersed between the fibers when the ribbon is incorporated in the roll. It is well known that the leaves are the most nutritious part of this type of hay. It follows that the pellet of this invention serves as a most effective means for preserving the most valuable constituents of the hay.

Figure 3:
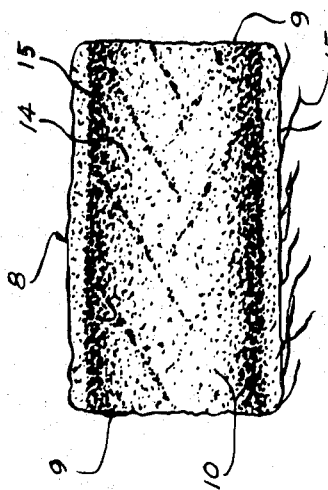
FIG. 3 is a longitudinal sectional view on the line 3—3 of FIG. 2.
Figure 4:
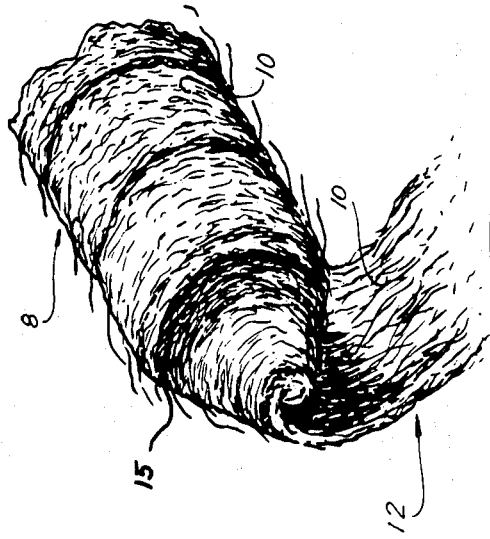
FIG. 4 is a perspective view of such a pellet partially unrolled.

The ribbon or ribbon-like body when incorporated in the roll is preferably wound in a helical configuration, and, when so wound, one edge of the ribbon-like body is supported or superimposed on the previous turn of the other edge, so that the ribbon is tilted as it is wound on itself. In other words, the cross section of the ribbon-like body is generally diagonal to the center line of the finished pellet, which relation is apparent in FIG. 3, the various layers being readily distinguishable in the pellet as sections 14. In fact, the ribbon-like body is so arranged as to loosely resemble a series of nested hollow cones and a consideration of the result will indicate that individual fibers 10 have what might be termed a combined spiral and helical disposition in the pellet as illustrated in FIGS. 1 and 4 of the drawings. In this connection it is to be noted that a helix is defined as a line, thread or wire, curved in shape as if wound in a single layer about a cylinder. A helix is to be contrasted with a spiral, which is defined as a plane curve formed by a point which revolves about a fixed center and continually increases its distance therefrom. As will be apparent, and as illustrated in the drawings, many individual straws forming part of ribbon-like body 12 will become wound in a path having characteristics of both a helix and a spiral, these terms being used in this specification in the conventional sense as above defined. The fibers adjacent the outer surface are more densely packed than the inner fibers, as previously stated, so that the pellet has an outer hard region 15, while the inside is very porous to provide efficient and rapid drying when such pellets are made under conditions of excessive moisture.

While the wrapping and compacting of the crop material alone may be relied upon to maintain the pellets in shape, it is contemplated that the fibers may be purposely bruised or ruptured to a greater or lesser extent during the making of the pellets, the moist components thereby liberated spreading among the fibers and acting as a binding agent to assist the wrapping and compacting of the fibers in holding the pellet together.

It is to be noted that, while the crop material is tightly wound or wrapped, compacted, and if required, bruised or ruptured, it is preferred to avoid any twisting of the pellets, which twisting would tend to break the relatively soft fibers and impair the strength and stability of the pellets. In other words, care is taken to maintain the rotational orientation of the various sections of each pellet with each other, as the pellet is formed and compacted.

A further characteristic of these pellets is that the extreme outer layer of fibers, beyond the aforesaid outer had region 15 is less densely packed than said outer hard region. This extreme outer layer preferably has a few loose or projecting fibers 15a, which facilitate the eating of the pellets by the animals.

Figure 5:
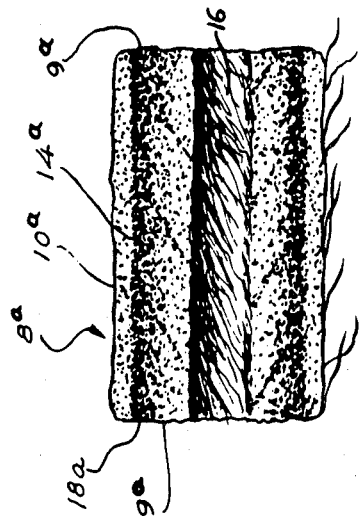
FIG. 5 is a view similar to FIG. 3 showing a modification.

It is contemplated that the pellets might be made to have a free space or opening extending through the center, as illustrated by the opening 16 in FIG. 5, in which case, however, the density will still vary, the fibers being more tightly packed together near the outer surface of the pellet at 18a than they are near the center.

The pellet 8a shown in FIG. 5 comprises a substantially cylindrical body having approximately square ends 9a, and composed of fibers 10a of forage material arranged in a ribbon, as in the case of the hereinbefore described embodiment, and which ribbon is tilted and wound on itself about a central rotating spindle or skewer, not shown, to form a series of sections 14a. The several turns of the rubber are compacted and then removed from the spindle so as to provide an open or substantially open space or passageway 16 extending axially through the pellet. Such a space aids in the drying of pellets which may have been made under conditions of excessive moisture. Under some conditions, the opening formed by the spindle may not remain as the pellet is removed from the spindle, and the pellet may extend inwardly into the space left by the spindle, but even in that event, the temporary presence of the opening even though it does not persist, helps in making sure that the fibers near the center of the pellet are less tightly packed than those near the outer edge. As in the case of the previously described embodiment, the pellet of FIG. 5 has an outer hard region 18a toward the outer surface and spaced from the passageway 16.

Pellets of the type contemplated by the present invention were formed of a size that could be accepted by an animal, such as a cow, in one piece, that is the pellets had a diameter of less than three inches and a length of less than four inches. Pellets of this size were fed to cows and it was observed that the cows would undertake to unwrap the pellet before mastication even though the pellets were bite-size. It is believed that the cows undertake to unwrap the bite-size pellets because they are accustomed to grapsing long straws and fibers rather than gulping pellets in one piece. Based on this information, the diameter and length of the pellets were increased to three inches and four inches, respectively, to increase the capacity of the machine. These pellets were fed to cows and some of the pellets were rejected. Some of the pellets were then cut in half, axially, and it was observed that the cows preferred the shorter pellets but would still unwrap the pellets before mastication.

Various types of materials, such as Coastal Bermuda and brome grass, were used in forming subsequent pellets and it was determined that the longer stem hay, such as brome grass would produce better pellets.

While it is not desired nor intended to limit this application beyond the requirements of the prior art, it is to be noted that actual pellets made according to the foregoing description, when unwrapped have been found to contain hay as much as eight times the length of the original pellet, and many of the individual fibers have been found to extend in a generally helical path throughout a substantial portion of the length of the pellet.

The pellets described are small, compact, stable, and readily handled by mechanical means. On the other hand, unlike many pellets formed by presently known mechanisms and processes, they are readily broken up or unwrapped and chewed by the cattle, and when so broken up, open into long fibers which are nonirritating, and to which the cattle are accustomed. The use of such pellets will result in healthy stock and favorable milk production.

A cow, for example, will quickly learn to grasp the outer loose fibers of the bite-size pellets and start an unrolling action which leads into the dense layers beneath, to start them also unrolling. As the animal continues to work and pull fibers off the pellet, it eventually unrolls completely. The food material thus received is in the form of long straws and fibers familiar to livestock, with the entire width of the layer of fibers being readily acceptable in the mouth, and in a form favorable to stimulate the production of high butterfat milk.

What is claimed is:

1. A feed article for animals comprising a bite-size body of hay in the form of an axially open-center cylinder, compacted interlocking layers of said hay extending spirally around said axially open center, said layers having a relatively higher density near the outer perimeter relative to the layers near the open-center core.

References Cited

UNITED STATES PATENTS

| | | | |
|---|---|---|---|
| 846,735 | 3/1907 | Duncan | 99—2 |
| 963,775 | 7/1910 | Killman | 99—2 |
| 1,213,284 | 1/1917 | Slathar | 99—8 |
| 3,357,835 | 12/1967 | Molitorisz | 99—8 |

RAYMOND N. JONES, Primary Examiner

J. M. HUNTER, Assistant Examiner